United States Patent
Fujiwara

(10) Patent No.: US 9,845,835 B2
(45) Date of Patent: Dec. 19, 2017

(54) SPLIT TYPE CAGE, ONE-WAY CLUTCH AND JOINT FOR POWER-GENERATION DEVICE

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/106,868

(22) PCT Filed: Dec. 24, 2014

(86) PCT No.: PCT/JP2014/084070
§ 371 (c)(1),
(2) Date: Jun. 21, 2016

(87) PCT Pub. No.: WO2015/098925
PCT Pub. Date: Jul. 2, 2015

(65) Prior Publication Data
US 2017/0037913 A1  Feb. 9, 2017

(30) Foreign Application Priority Data

Dec. 25, 2013 (JP) ................................. 2013-267275

(51) Int. Cl.
*F16D 41/067* (2006.01)
*F16D 41/06* (2006.01)

(52) U.S. Cl.
CPC .... *F16D 41/067* (2013.01); *F16D 2041/0605* (2013.01); *F16D 2041/0608* (2013.01); *Y02E 10/722* (2013.01)

(58) Field of Classification Search
CPC ................. F16C 2041/0605; F16C 2041/0608
See application file for complete search history.

(56) References Cited

U.S. PATENT DOCUMENTS

| 3,877,555 | A | 4/1975 | Rist |
| 4,613,763 | A | 9/1986 | Swansen |
| (Continued) | | | |

FOREIGN PATENT DOCUMENTS

| FR | 2747444 A1 | 10/1997 |
| FR | 2913081 A1 | 8/2008 |
| (Continued) | | |

OTHER PUBLICATIONS

Jun. 15, 2017 Office Action Issued in U.S. Appl. No. 14/774,472.
(Continued)

*Primary Examiner* — Jacob S. Scott
*Assistant Examiner* — Timothy Hannon
(74) *Attorney, Agent, or Firm* — Oliff PLC

(57) ABSTRACT

A split type cage includes: a pair of annular portions including recess portions formed on an inner periphery side at intervals in a circumferential direction; and a pillar portion which includes pillar end portions on both end sides in an axial direction and fitted in the recess portions, and on which a reaction toward an other side in the circumferential direction acts. The recess portion includes a wedge-shaped surface forming a wedge-shaped space, which becomes narrower in a radial direction toward the other side in the circumferential direction, between the wedge-shaped surface and an outer peripheral surface of an inner ring. The pillar end portion has a wedge shape in which a radial dimension decreases toward the other side in the circumferential direction, and includes a radial outside surface contacting the wedge-shaped surface and a radial inside surface contacting the outer peripheral surface of the inner ring.

10 Claims, 8 Drawing Sheets

(56) References Cited

U.S. PATENT DOCUMENTS

| | | |
|---|---|---|
| 5,908,094 A | 6/1999 | Le-Calve |
| 6,227,803 B1 | 5/2001 | Shim |
| 6,856,042 B1 | 2/2005 | Kubota |
| 7,851,933 B2 | 12/2010 | Duffey et al. |
| 2005/0087417 A1 | 4/2005 | Shimomura et al. |
| 2008/0053778 A1 | 3/2008 | Shimomura et al. |
| 2008/0223684 A1 | 9/2008 | Duffey et al. |
| 2008/0230341 A1 | 9/2008 | Barraud et al. |
| 2012/0045335 A1 | 2/2012 | Heidenreich et al. |
| 2012/0201679 A1 | 8/2012 | Heidenreich et al. |
| 2013/0062886 A1 | 3/2013 | Fujiwara et al. |
| 2013/0283949 A1 | 10/2013 | Fujiwara |
| 2015/0061436 A1 | 3/2015 | Fujiwara et al. |

FOREIGN PATENT DOCUMENTS

| | | |
|---|---|---|
| JP | H04-344198 A | 11/1992 |
| JP | H09-229097 A | 9/1997 |
| JP | 2001-349335 A | 12/2001 |
| JP | 2006-097713 A | 4/2006 |
| JP | 2006-183755 A | 7/2006 |
| JP | 2006-250034 A | 9/2006 |
| JP | 2008-208999 A | 9/2008 |
| JP | 2013-060825 A | 4/2013 |
| JP | 2013-231448 A | 11/2013 |

OTHER PUBLICATIONS

Oct. 17, 2016 Extended Search Report issued in European Patent Application No. 14762691.5.
Jun. 10, 2014 International Search Report issued in International Patent Application No. PCT/JP2014/055413.
U.S. Appl. No. 14/774,472, filed Sep. 10, 2015.
Mar. 31, 2015 Search Report issued in International Patent Application No. PCT/JP2014/084070.

US 9,845,835 B2

SPLIT TYPE CAGE, ONE-WAY CLUTCH AND JOINT FOR POWER-GENERATION DEVICE

TECHNICAL FIELD

Aspects of the present invention relate to a split type cage used for a one-way clutch, the one-way clutch and a joint for a power generation device having the one-way clutch.

BACKGROUND ART

As a wind power generation device, there is known a device in which a blade receives wind, a main shaft connected to the blade rotates, and the speed of the rotation of the main shaft is increased by a speed increaser to drive a power generator. This type of wind power generation device has a problem in that changes in wind speed and wind direction change the number of rotations transmitted from the blade to the power generator through the main shaft, the speed increaser and the like to thereby decrease the power generation efficiency.

Accordingly, to improve the power generation efficiency, the present applicant has already proposed a wind power generation device in which a one-way clutch is disposed between the speed increaser and the power generator (see Patent Document 1). In this wind power generation device, even if the wind speed and the like change to reduce the rotation speed of the main shaft, by disconnecting the output shaft of the speed increaser and the input shaft of the power generator by the one-way clutch, the input shaft of the power generator can continue to rotate by inertia without rapidly decreasing in speed, so that the average rotation speed of the input shaft can be increased to improve the power generation efficiency.

The above-mentioned one-way clutch is provided with, as shown in FIG. 8, an inner ring 101, an outer ring 102, a plurality of rollers (engagement elements) 103, a ring-shaped cage 104 holding these rollers 103 at predetermined intervals in the circumferential direction, and springs 105 elastically urging the rollers 103 toward one side in the circumferential direction. In the cage 104, a pair of annular portions 106 facing in the axial direction and a plurality of pillar portions 107 coupling the annular portions 106 are integrally formed and pockets 108 accommodating one roller 103 and one spring 105 are formed between the annular portions 106 and the pillar portions 107 adjoining in the circumferential direction. Moreover, the pillar portions 107 are provided with a protruding portion 109 protruding in the circumferential direction in order to support the spring 105 in the pocket 108.

However, since the pockets 108 are formed by the spaces surrounded by the annular portions 106 and the pillar portions 107 and the pillar portions 107 have a complicated shape having the protruding portion 109, such a method in which the cage 104 is manufactured by carving increases the cost, which is undesirable. Moreover, although a method is considered in which a synthetic resin material is injection-molded to integrally form the cage 104 having the above-described structure, since the cage 104 used for a power generation device is large in size, it is difficult to form such a large-size cage 104 by injection molding.

Accordingly, the present applicant has further proposed a split type in order that a cage for a one-way clutch as described above can be easily manufactured (see Patent Document 2). That is, as shown in FIG. 9, this split type cage 90 has a pair of annular portions 91 facing in the axial direction and a plurality of pillar portions 92 which are separate members from these annular portions 91, and is assembled by fitting the axial end portions of the pillar portions 92 to the annular portions 91.

RELATED ART DOCUMENTS

Patent Documents

Patent Document 1: JP-A-2013-060825
Patent Document 2: JP-A-2013-231448

SUMMARY OF THE INVENTION

Problem to be Solved by the Invention

According to the split type cage 90 shown in FIG. 9, by the annular portions 91 and the pillar portions 92 being separate members, these can be individually manufactured, so that the cage 90 can be easily manufactured. Moreover, while the pillar portions 92 have a protruding portion 96 for supporting a non-illustrated spring, the pillar portions 92 including the protruding portion 96 can be easily manufactured, for example, by performing injection molding.

Although making the cage 90 a split type facilitates its manufacture as described above, the shape of the end portions (pillar end portions 93) of the pillar portions 92 and the shape of recess portions 94 of the annular portions 91 to which the pillar end portions 93 are fitted are complicated (see FIG. 10). FIG. 10 is an explanatory view where the pillar end portion 93 of the split type cage 90 and its surroundings are viewed from the axial direction.

The reason why the shape of the pillar end portion 93 is complicated is that by the spring 105 urging the roller 103 toward one side in the circumferential direction as described above, the reaction F toward the other side in the circumferential direction acts on the pillar portion 92 and a structure for the annular portion 91 to support this reaction F through the pillar end portion 93 (structure to transmit it to the annular portion 91) is required. That is, the reason is that in order for the annular portion 91 to support the reaction F, it is necessary to form a load receiving surface 95 substantially orthogonal to the circumferential direction on the other side of the pillar end portion 93 in the circumferential direction and bring the load receiving surface 95 into contact with a side surface 94a of the recess portion 94. Further, the area of the load receiving surface 95 is made large in order to decrease the contact pressure of the load receiving surface 95 and the side surface 94a.

As described above, in order to provide the load receiving surface 95 having a large area on the other side of the pillar end portion 93 in the circumferential direction, it is necessary to increase the radial dimension of the pillar end portion 93, and as a consequence, the outline shape (cross-sectional shape) of the pillar end portion 93 is a complicated shape with many projections and depressions as shown in FIG. 10. Moreover, in order that the load receiving surface 95 and the side surface 94a are accurately in contact with each other, it is necessary that these surfaces (95, 94a) have the same shape, and for this reason, management with high dimensional accuracy is required when the portions are manufactured. For this reason, for the pillar end portion 93 and the recess portion 94 in which this is fitted, not only there are many projections and depressions and the shape is complicated but a delicate dimension management is also required in manufacture.

Accordingly, an object of aspects of the present invention is to provide a split type cage with a simplified structure, a one-way clutch having this split type cage, and a joint for a power generation device having this one-way clutch.

Means for Solving the Problem (1) One aspect of the present invention provides a split type cage, in which a plurality of pockets each accommodating an engagement element between an inner ring and an outer ring of a one-way clutch are formed along a circumferential direction, and a spring provided in each pocket urges the engagement element toward one side in the circumferential direction to thereby cause a reaction toward an other side in the circumferential direction to act, the split type cage including: a pair of annular portions which are provided between the inner ring and the outer ring so as to face in an axial direction, and which include a plurality of recess portions formed on an inner periphery side at intervals in the circumferential direction; and a pillar portion which is a separate member from the pair of annular portions, which includes pillar end portions on both end sides in the axial direction and fitted in the recess portions, and on which the reaction acts, wherein the recess portion includes a wedge-shaped surface which forms a wedge-shaped space between the wedge-shaped surface and an outer peripheral surface of the inner ring, the wedge-shaped space becoming narrower in a radial direction toward the other side in the circumferential direction, and wherein the pillar end portion has a wedge shape in which a radial dimension decreases toward the other side in the circumferential direction, and includes a radial outside surface which contacts the wedge-shaped surface and a radial inside surface which contacts the outer peripheral surface of the inner ring.

According to this aspect, the pillar end portions having the wedge shape where the radial dimension decreases toward the other side in the circumferential direction are fitted in the wedge-shaped spaces formed between the wedge-shaped surfaces of the recess portions of the annular portions and the outer peripheral surface of the inner ring and becoming narrower in the radial direction toward the other side in the circumferential direction. The radial outside surfaces of the pillar end portions contact the wedge-shaped surfaces of the recess portions, and the radial inside surfaces of the pillar end portions contact the outer peripheral surface of the inner ring. For this reason, by the springs urging the engagement elements toward one side in the circumferential direction, the reaction thereof (the reaction toward the other side in the circumferential direction) acts on the pillar portion; however, since the wedge-shaped pillar end portions are fitted in the wedge-shaped spaces and the reaction is transmitted from the radial outside surfaces and the radial inside surfaces of the pillar end portions to the annular portions and the inner ring, a load receiving surface provided on the other side in the circumferential direction of the pillar end portions and substantially orthogonal to the circumferential direction as in the background art is unnecessary. For this reason, the shape of the pillar end portions is simplified, and the shape of the recess portions of the annular portions in which the pillar end portions are fitted is also simplified, which results in the split type cage where the structures of the portions are simplified.

(2) Moreover, it is preferable that the radial outside surface is a flat surface, and the wedge-shaped surface is also a flat surface, whereby the shapes of the radial outside surfaces of the pillar end portions and the wedge-shaped surfaces in contact with the radial outside surfaces are simplified.

(3) Moreover, it is preferable that the radial inside surface is a flat surface, whereby the shape of the radial inside surfaces of the pillar end portions is simplified.

(4) Moreover, it is preferable that a circumferential dimension of the recess portion is larger than a circumferential dimension of the pillar end portion.

In this case, a clearance in the circumferential direction is formed between the recess portions and the pillar end portions, so that the work to fit the pillar end portions into the recess portions of the annular portions (the work of assembly of the pillar portion and the annular portions) is facilitated.

(5) Moreover, another aspect of the present invention provides a one-way clutch including: an inner ring; an outer ring concentric with the inner ring; a plurality of engagement elements provided between the inner ring and the outer ring; a cage in which a plurality of pockets accommodating the engagement elements, respectively, are formed along a circumferential direction; and a spring which is provided in the pocket, and which urges the engagement element toward one side in the circumferential direction, wherein the cage includes: a pair of annular portions which are provided between the inner ring and the outer ring so as to face in an axial direction, and which include a plurality of recess portions formed on an inner periphery side at intervals in the circumferential direction; and a pillar portion which is a separate member from the pair of annular portions, which includes pillar end portions on both end sides in the axial direction and fitted in the recess portions, and on which a reaction toward an other side in the circumferential direction acts by the spring, wherein the recess portion includes a wedge-shaped surface which forms a wedge-shaped space between the wedge-shaped surface and an outer peripheral surface of the inner ring, the wedge-shaped space becoming narrower in a radial direction toward the other side in the circumferential direction, and wherein the pillar end portion has a wedge shape in which a radial dimension decreases toward the other side in the circumferential direction, and includes a radial outside surface which contacts the wedge-shaped surface and a radial inside surface which contacts the outer peripheral surface of the inner ring.

According to this aspect, since the split type cage according to the above (1) where the structures of the portions are simplified is provided, the cost of the one-way clutch can be reduced.

(6) Moreover, yet another aspect of the present invention provides a joint for a power generation device, the power generation device including: a main shaft which rotates by external power; a speed increaser including a rotation transmission mechanism which increases a rotation speed of the main shaft, and an output shaft which outputs a rotation increased in speed by the rotation transmission mechanism; and a power generator which includes an input shaft rotating by receiving the rotation of the output shaft and which generates power by a rotation of a rotor which rotates integrally with the input shaft, wherein the joint for the power generation device includes a first rotating member which rotates integrally with the output shaft of the speed increaser; a second rotating member which rotates integrally with the input shaft of the power generator; and the one-way clutch according to the above (5) which is disposed between the first rotating member and the second rotating member.

According to this aspect, since the one-way clutch of the above (5) is provided, cost can also be reduced for the joint.

Advantages of the Invention

According to the split type cage of one aspect of the present invention, the structures of the portions are simplified, which facilitates manufacture. According to the one-way clutch and the joint for the power generation device of other aspects of the present invention, since the split type cage where the structures of the portions are simplified is provided, cost can be reduced.

MODE FOR CARRYING OUT THE INVENTION

Figure 1:
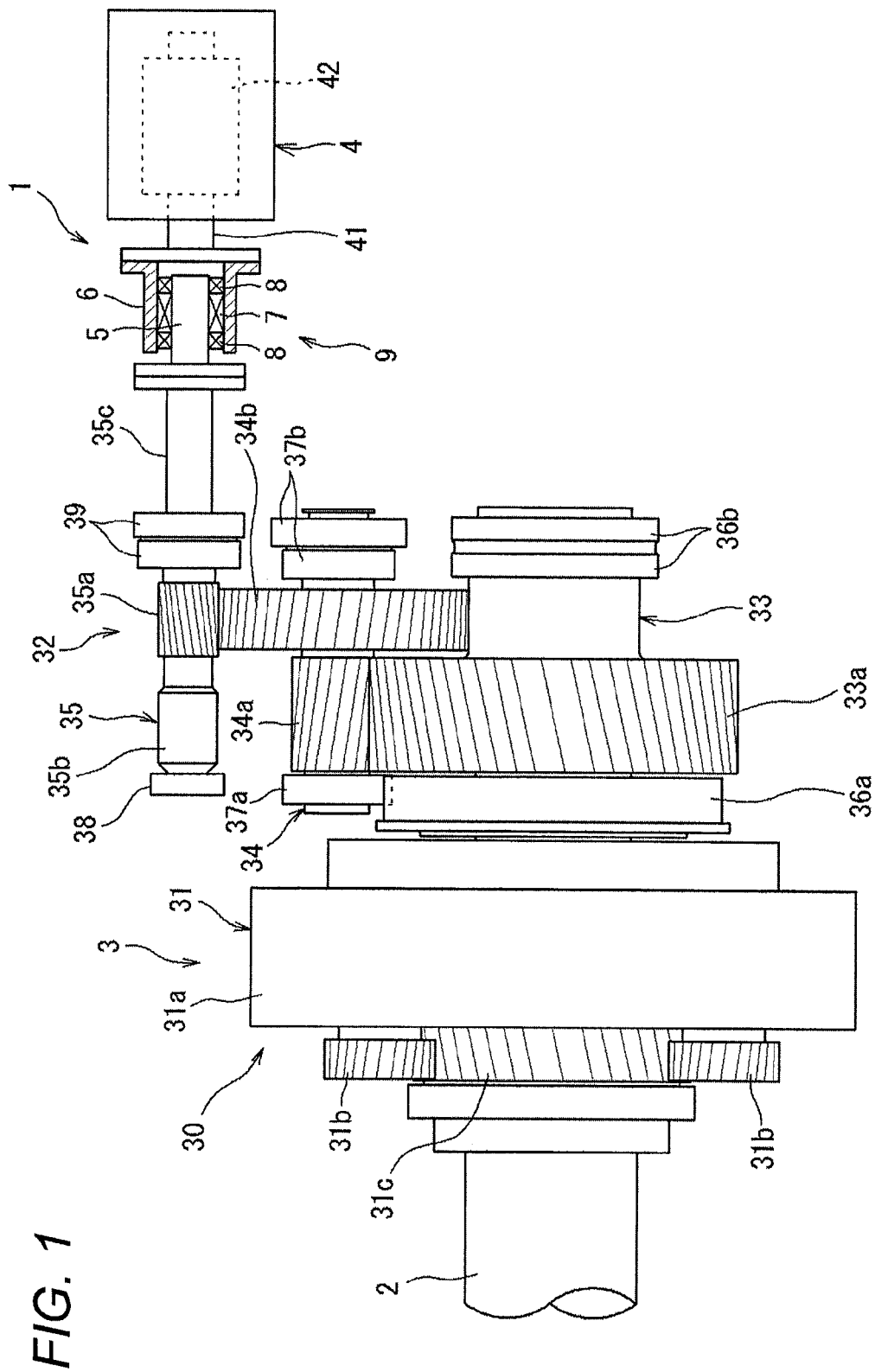
FIG. 1 is a schematic structural view showing a power generation device.

FIG. 1 is a schematic structural view showing a power generation device. This power generation device is a wind power generation device 1 and is provided with a main shaft 2 that rotates by receiving wind power (external power), a speed increaser 3 coupled to the main shaft 2 and a power generator 4 coupled to the speed increaser 3, and the rotation of the main shaft 2 is increased in speed by the speed increaser 3 and the power generator 4 is driven by the rotation of the shaft the speed of which has been increased, whereby power generation is performed.

The power generator 4 is formed of, for example, an induction power generator, and has an input shaft 41 that rotates by receiving the rotation increased in speed by the speed increaser 3, a rotor 42 incorporated in the power generator 4, a non-illustrated stator, and the like. The rotor 42 is coupled to the input shaft 41 in such a manner that it is rotatable integrally therewith, and the power generator 4 generates power as the input shaft 41 rotates to drive the rotor 42.

The speed increaser 3 is provided with a gear mechanism (rotation transmission mechanism) 30 that receives the rotation of the main shaft 2 and increases the speed of the rotation. The gear mechanism 30 is provided with a planet gear mechanism 31 and a high-speed stepped gear mechanism 32 that receives the rotation increased in speed by the planet gear mechanism 31 and further increases the speed of the rotation.

The planet gear mechanism 31 has an internal gear (ring gear) 31a, a plurality of planet gears 31b held by a planet carrier (not shown) coupled to the main shaft 2 in such a manner that it is rotatable integrally therewith, and a sun gear 31c meshing with the planet gears 31b. Thereby, when the planet carrier rotates together with the main shaft 2, the sun gear 31c rotates through the planet gears 31b, and the rotation is transmitted to a low-speed shaft 33 of the high-speed stepped gear mechanism 32.

The high-speed stepped gear mechanism 32 is provided with the low-speed shaft 33 having a low-speed gear 33a, an intermediate shaft 34 having a first intermediate gear 34a and a second intermediate gear 34b, and an output shaft 35 having a high-speed gear 35a.

The low-speed shaft 33 is formed of a large-size rotation shaft the diameter of which is, for example, approximately 1 m, and is disposed concentrically with the main shaft 2. Both end portions of the low-speed shaft 33 in the axial direction are rotatably supported by rolling bearings 36a and 36b.

The intermediate shaft 34 is disposed parallel to the low-speed shaft 33, and both end portions thereof in the axial direction are rotatably supported by rolling bearings 37a and 37b. The first intermediate gear 34a of the intermediate shaft 34 meshes with the low-speed gear 33a, and the second intermediate gear 34b meshes with the high-speed gear 35a.

The output shaft 35 is disposed parallel to the intermediate shaft 34, and outputs a running torque. The sides of one end portion 35b and the other end portion (output end portion) 35c of the output shaft 35 in the axial direction are rotatably supported by roller bearings 38 and 39, respectively.

By the above structure, the rotation of the main shaft 2 is increased in speed in three steps by the gear ratio of the planet gear mechanism 31, the gear ratio between the low-speed gear 33a and the first intermediate gear 34a and the gear ratio between the second intermediate gear 34b and the high-speed gear 35a, and is outputted from the output shaft 35. That is, the rotation of the main shaft 2 by wind power is increased in speed in three steps by the speed increaser 3 and outputted from the output shaft 35, and the power generator 4 is driven by the running torque of the output shaft 35.

Figure 2:
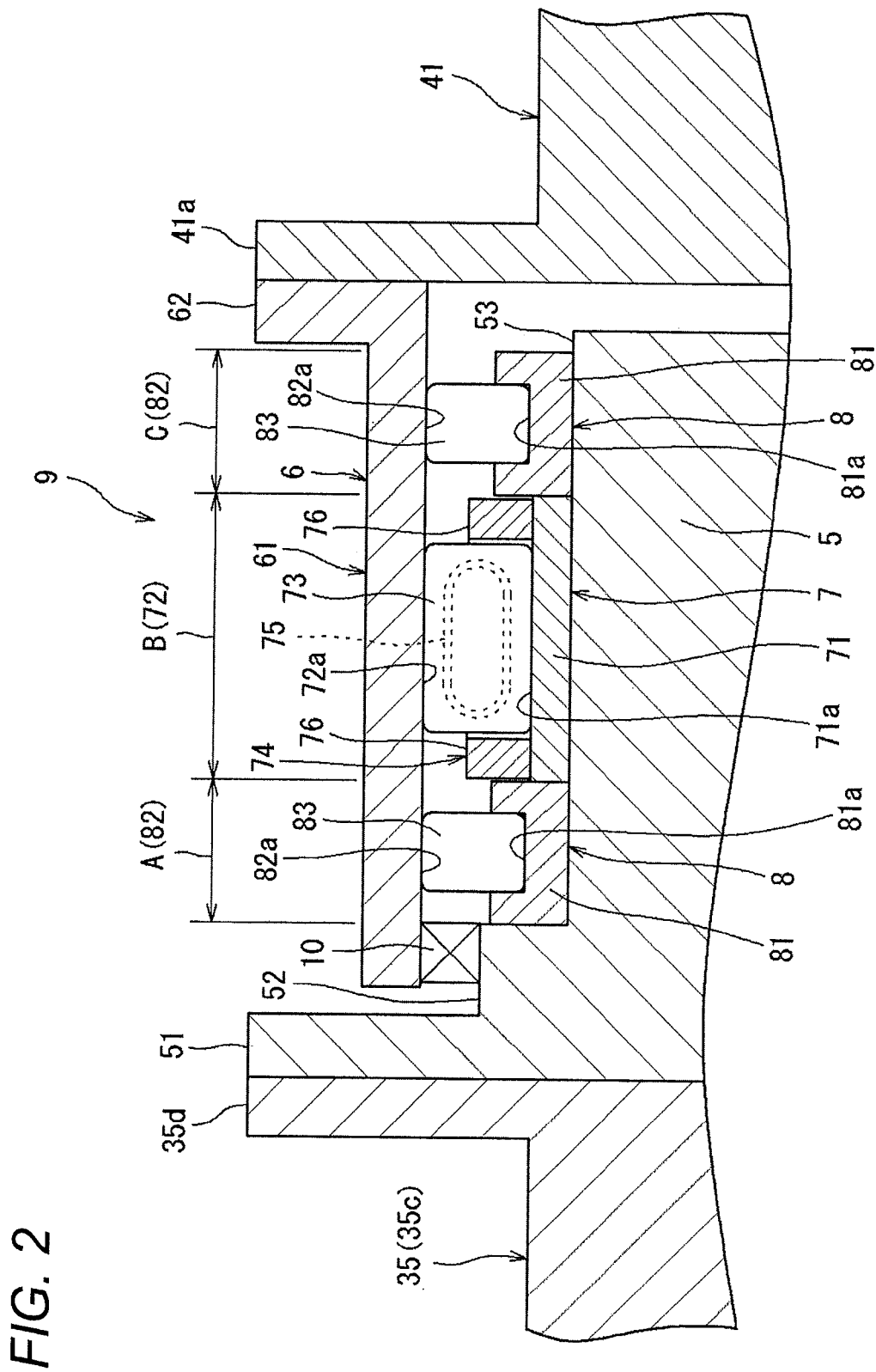
FIG. 2 is a longitudinal cross-sectional view showing a joint of the power generation device and its surroundings.

Moreover, the wind power generation device 1 is provided with a joint 9 for coupling the output shaft 35 of the speed increaser 3 and the input shaft 41 of the power generator 4. FIG. 2 is a longitudinal cross-sectional view showing the joint 9 and its surroundings. The joint 9 is provided in an area between the output shaft 35 and the input shaft 41 to enable torque transmission between the output shaft 35 and the input shaft 41. The joint 9 has a first rotating member 5, a second rotating member 6, a one-way clutch 7 and rolling bearings 8. The one-way clutch 7 and the rolling bearings 8 are disposed between the first rotating member 5 and the second rotating member 6.

The first rotating member 5 is a shaft member disposed concentrically with the output shaft 35, and has a flange portion 51, a large-diameter portion 52 and a small-diameter portion 53 in this order from one end portion thereof in the axial direction (the left end portion in FIG. 2) toward the other end portion in the axial direction (the right end portion in FIG. 2). The flange portion 51 is fixed to an end portion flange 35d of the output shaft 35 in such a manner that it is detachably attachable, and the first rotating member 5 rotates integrally with the output shaft 35.

The second rotating member 6 is concentrically disposed on the outside of the first rotating member 5 in the radial direction, and has a cylindrical portion 61 and a flange portion 62 provided on the other end portion of the cylindrical portion 61 in the axial direction. While the second rotating member 6 is disposed on the outside of the first rotating member 5 in the radial direction in the present embodiment, the first rotating member 5 may be tubular and disposed on the inside of the first rotating member 5 in the radial direction. The flange portion 62 is fixed to an end portion flange 41a of the input shaft 41 in such a manner that it is detachably attachable, and the second rotating member 6 rotates integrally with the input shaft 41.

The inner peripheral surface of the cylindrical portion 61 is a cylindrical surface, and an annular sealing member 10 is provided between one end portion of the cylindrical portion 61 in the axial direction and the large-diameter portion 52 of the first rotating member 5.

The rolling bearings 8 are disposed between the small-diameter portion 53 of the first rotating member 5 and the cylindrical portion 61 of the second rotating member 6, and support the first rotating member 5 and the second rotating member 6 in such a manner that they are rotatable relatively to each other. The rolling bearings 8 are each formed of a cylindrical roller bearing, and provided with an inner ring 81, an outer ring 82 and a plurality of cylindrical rollers 83 rotatably disposed between the inner ring 81 and the outer ring 82. An area A and an area C on both axial end portions of the cylindrical portion 61 of the second rotating member 6 have the function as the outer rings 82 of the rolling bearings 8, and an outer ring raceway surface 82a of the outer ring 82 is formed on the inner surfaces of the areas A and C. The cylindrical rollers 83 are rollably disposed between the outer ring raceway surface 82a and an inner ring raceway surface 81a formed on the outer periphery of the inner ring 81.

Figure 3:
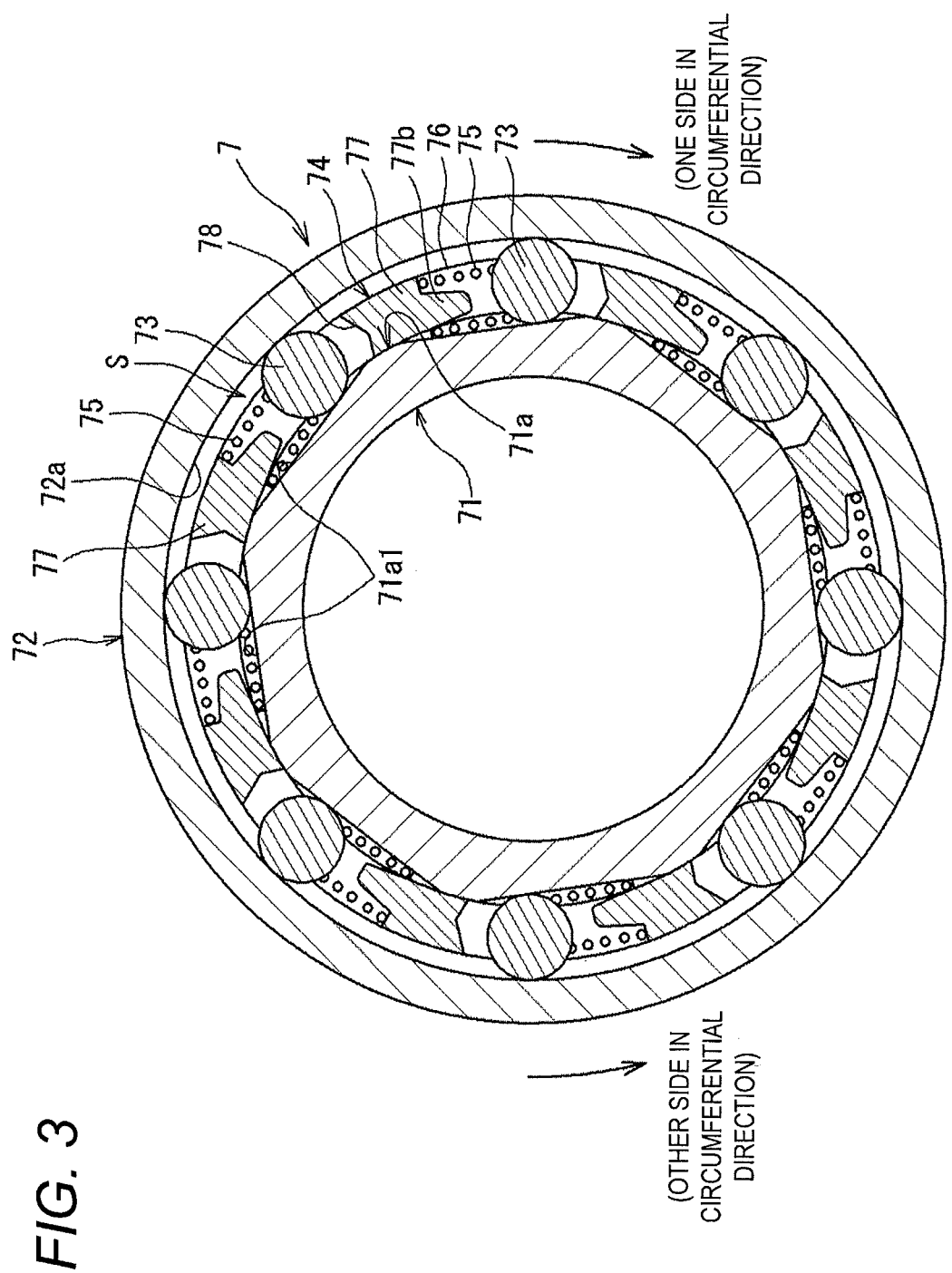
FIG. 3 is a transverse cross-sectional view of a one-way clutch.

FIG. 3 is a transverse cross-sectional view of the one-way clutch 7. In FIG. 2 and FIG. 3, the one-way clutch 7 is provided with an inner ring 71, an outer ring 72 concentric with the inner ring 71, a plurality of rollers (engagement elements) 73 provided between an outer peripheral surface 71a of the inner ring 71 and an inner peripheral surface 72a of the outer ring 72, a cage 74 where a plurality of pockets 78 accommodating the rollers 73 are formed along the circumferential direction, and springs 75 provided in the pockets 78 and elastically urging the rollers 73 toward one side in the circumferential direction (in FIG. 3, the clockwise direction).

The inner ring 71 is externally fitted and fixed to the central part of the small-diameter portion 53 of the first rotating member 5 in the axial direction (see FIG. 2), and rotates integrally with the first rotating member 5. An area B of the central part of the cylindrical portion 61 of the second rotating member 6 in the axial direction has the function as the outer ring 72 of the one-way clutch 7. The rollers 73 are cylindrical, and disposed eight in number in the circumferential direction in the present embodiment. The springs 75 are formed of a compression coil spring, and are individually accommodated in the pockets 78 of the cage 74.

While the second rotating member 6 is used as the outer ring 72 of the one-way clutch 7 and the outer rings 82 of the rolling bearings 8 in the present embodiment, these outer rings 72 and 82 may be provided separately from the second rotating member 6.

In FIG. 3, flat (planar) cam surfaces 71a1 of the same number (eight) as that of the rollers 73 are formed on the outer peripheral surface 71a of the inner ring 71, and the inner peripheral surface 72a of the outer ring 72 is a cylindrical surface. Thereby, a plurality of (eight) wedge-shaped spaces S are formed along the circumferential direction between the cam surfaces 71a1 and the inner peripheral surface 72a. The rollers 73 and the springs 75 are individually disposed in the wedge-shaped spaces S, and the springs 75 urge the rollers 73 in a direction in which the wedge-shaped spaces S become narrower (toward one side in the circumferential direction). The outer peripheral surfaces of the rollers 73 are contact surfaces that are in contact with the cam surfaces 71a1 and the inner peripheral surface 72a, and these contact surfaces are formed straightly in the width direction (the axial direction).

In the one-way clutch 7 structured like this, when the rotation speed of the first rotating member 5 exceeds the rotation speed of the second rotating member 6 by the first rotating member 5 rotating with increasing speed, the inner ring 71 behaves so as to relatively rotate in one direction (the clockwise direction in FIG. 3) with respect to the outer ring 72. In this case, by the pressing force of the springs 75, the rollers 73 slightly move in a direction in which the wedge-shaped spaces S become narrower so that the contact surfaces (outer peripheral surfaces) of the rollers 73 are in pressure contact with the outer peripheral surface 71a (the cam surfaces 71a1) of the inner ring 71 and the inner peripheral surface 72a of the outer ring 72, which results in a condition where the rollers 73 are meshed between the inner and outer rings 71 and 72. This enables the inner and outer rings 71 and 72 to integrally rotate in the one direction, so that the first rotating member 5 and the second rotating member 6 are integrally rotatably connected. As a consequence, the output shaft 35 and the input shaft 41 can be integrally rotated.

Moreover, when the rotation of the first rotating member 5 becomes a constant speed rotation after the rotation with increasing speed and the rotation speed of the first rotating member 5 becomes the same as the rotation speed of the second rotating member 6, the rollers 73 are held in a state of being meshed between the inner and outer rings 71 and 72. For this reason, the one-way clutch 7 maintains the integral rotation of the inner and outer rings 71 and 72 in the one direction, so that the first rotating member 5 and the second rotating member 6 (the output shaft 35 and the input shaft 41) continue to rotate integrally.

On the other hand, when the rotation speed of the first rotating member 5 is lower than the rotation speed of the second rotating member 6 by the first rotating member 5 rotating with decreasing speed, the inner ring 71 behaves so as to relatively rotate in the other direction (the counterclockwise direction in FIG. 3) with respect to the outer ring 72. In this case, the meshing between the rollers 73 and the inner and outer rings 71 and 72 is released by the rollers 73 slightly moving in a direction in which the wedge-shaped spaces S become wider against the pressing force of the springs 75. As described above, by the meshing of the rollers 73 being released, the relative rotation of the inner and outer rings 71 and 72 in the other direction is allowed, and the first rotating member 5 and the second rotating member 6 are disconnected. As a consequence, the output shaft 35 and the input shaft 41 are enabled to rotate relatively to each other (idle).

Figure 4:
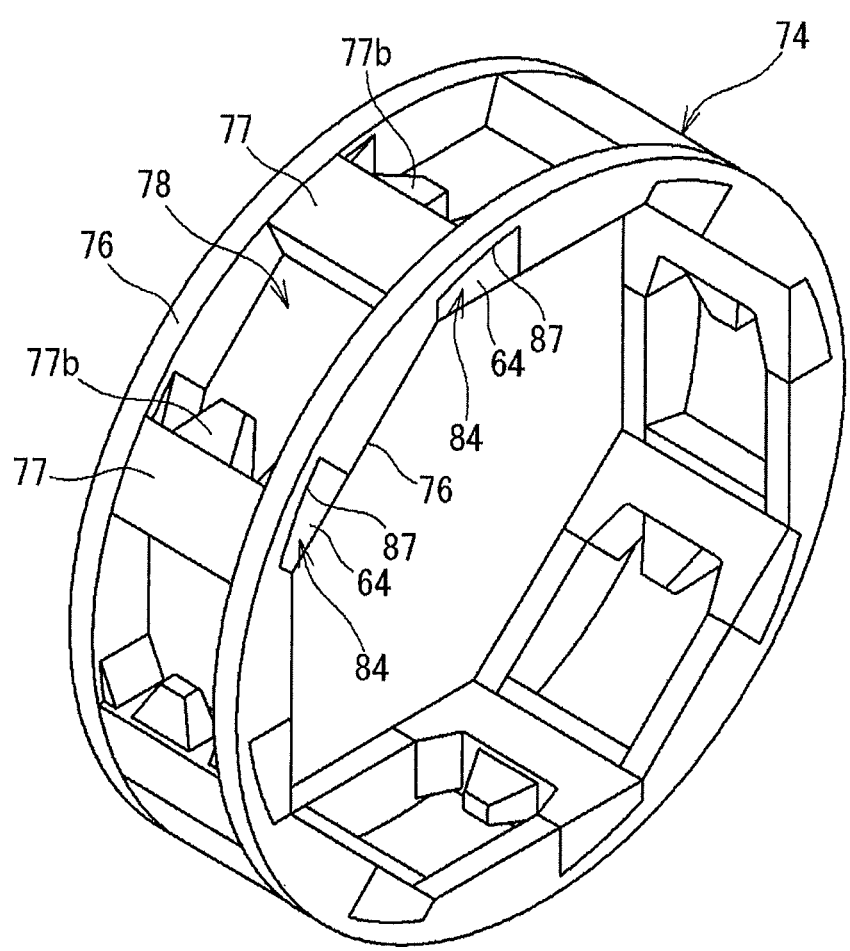
FIG. 4 is a perspective view showing a cage of the one-way clutch.

FIG. 4 is a perspective view showing the cage 74 of the one-way clutch 7. This cage 74 is a split type cage, and has a pair of annular portions 76 facing in the axial direction and a plurality of pillar portions 77 which are separate members from the annular portions 76. Both end portions (pillar end portions 64) of the pillar portions 77 in the axial direction are fitted in later-described recess portions 84 provided on the annular portions 76, whereby the pillar portions 77 couple the pair of annular portions 76. The pockets 78 are formed between the annular portions 76 and the pillar portions 77 adjoining in the circumferential direction, and the rollers 73 are accommodated in the pockets 78, respectively (see FIG.

3). This enables the cage 74 to hold a plurality of rollers 73 at intervals in the circumferential direction.

Figure 5:
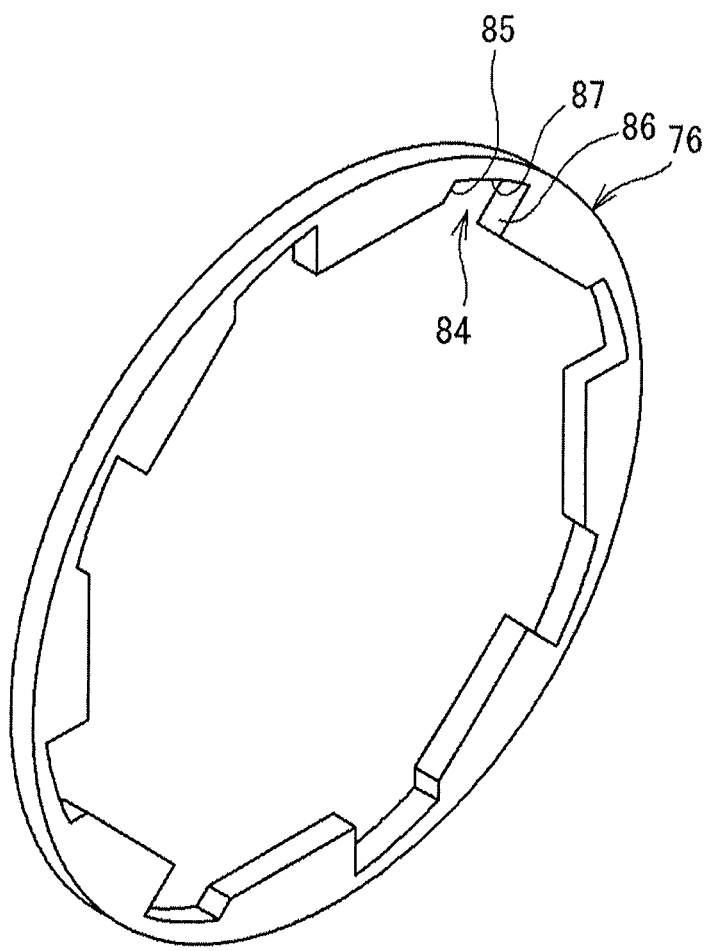
FIG. 5 is a perspective view of an annular portion of the cage.

FIG. 5 is a perspective view of the annular portions 76 of the cage 74. The annular portions 76 are made of a metal such as carbon steel or aluminum, and is, for example, a ring-shaped member with an outer diameter of 300 mm and an axial thickness of 15 mm. Between the inner ring 71 and the outer ring 72 of the one-way clutch 7 (see FIG. 3), a pair of annular portions 76 are provided in such a manner as to face in the axial direction.

In FIG. 5, on the inner periphery side of each annular portion 76, a plurality of recess portions 84 are formed at intervals in the circumferential direction. The recess portions 84 each have a first side surface 85 and a second side surface 86 situated on both sides in the circumferential direction and a wedge-shaped surface 87 provided between these side surfaces 85 and 86 and facing the inside in the radial direction.

Figure 6:
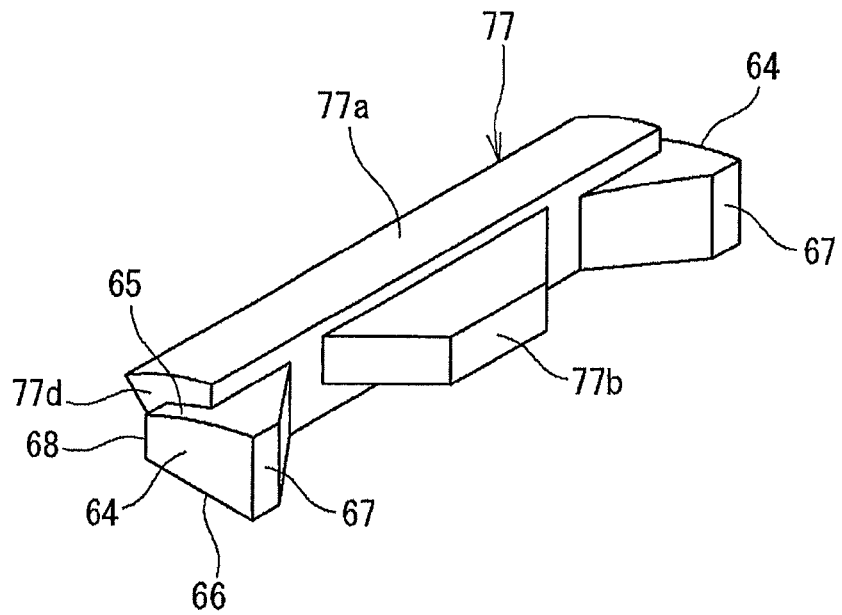
FIG. 6 is a perspective view of a pillar portion of the cage.

FIG. 6 is a perspective view of the pillar portion 77 of the cage 74. The pillar portion 77 is made by injection-molding a synthetic resin material. The pillar portion 77 has a main portion 77a, a protruding portion 77b provided so as to protrude from one end surface of the main portion 77a in the circumferential direction and a pair of pillar end portions 64 provided on both sides of the main portion 77a in the axial direction. The protruding portion 77b is, as shown in FIG. 3, for supporting the spring 75 in a predetermined position in the pocket 78, and the coiled spring 75 is externally fitted to the protruding portion 77b.

In FIG. 6, the pillar end portions 64 are formed so that the thickness in the radial direction (the vertical direction in the figure) is smaller than that of the main portion 77a, and a step surface 77d is formed between the outer peripheral surface of the pillar end portion 64 and the outer peripheral surface of the main portion 77a. The pillar end portions 64 are fitted in the recess portions 84 (see FIG. 5) provided on the annular portions 76, thereby assembling the split type cage 74 (see FIG. 4).

According to the one-way clutch 7 structured like this, since the annular portions 76 and the pillar portions 77 constituting the cage 74 are separate members, the annular portions 76 and the pillar portions 77 can be individually manufactured. Consequently, manufacture is easy compared with when the entire cage is integrally manufactured.

Here, as described above, in each pocket 78 (see FIG. 3), the spring 75 is situated between the pillar portion 77 and the roller 73, and the spring 75 urges the roller 73 toward one side in the circumferential direction. For this reason, the reaction of the spring 75 urging the roller 73 acts on the pillar portion 77. This reaction becomes a force toward the other side in the circumferential direction.

Figure 7:
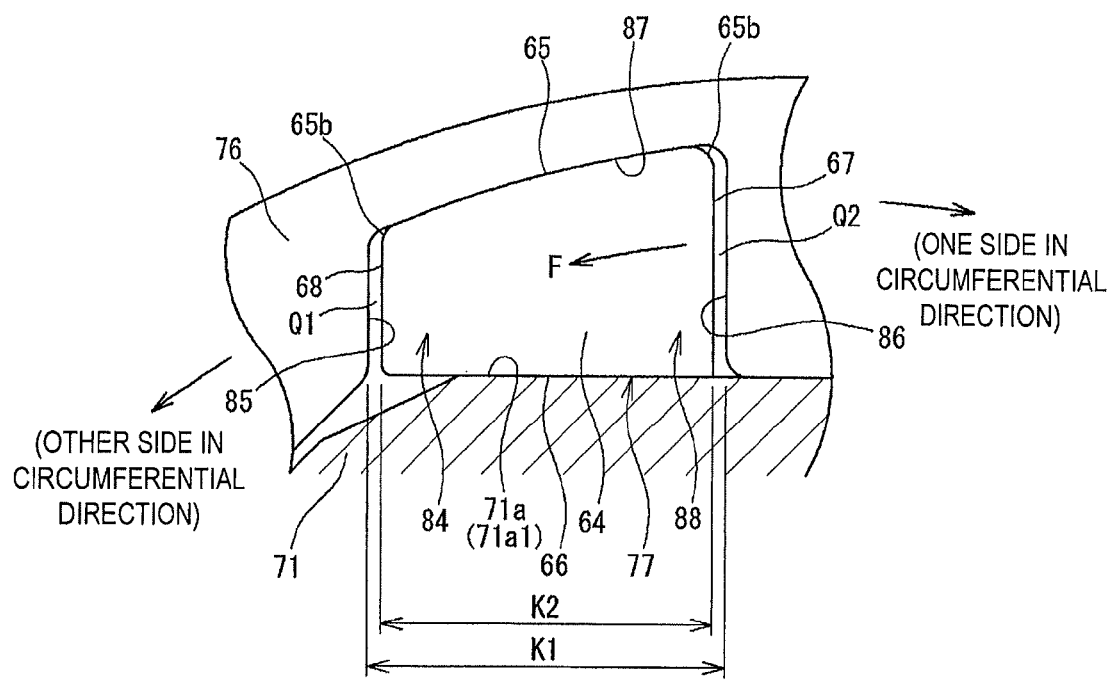
FIG. 7 is an explanatory view where a pillar end portion and its surroundings are viewed from the axial direction.
Figure 8:
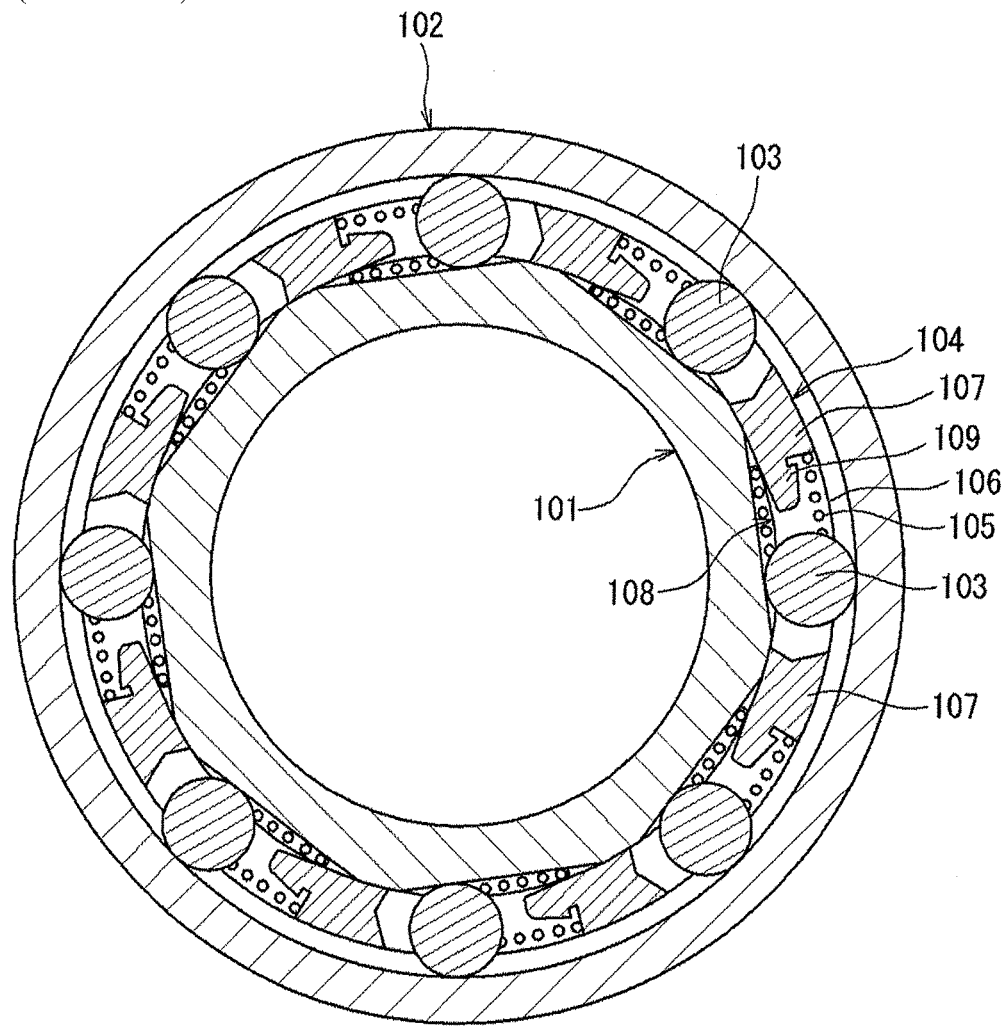
FIG. 8 is a transverse cross-sectional view of the one-way clutch of the background art.
Figure 9:
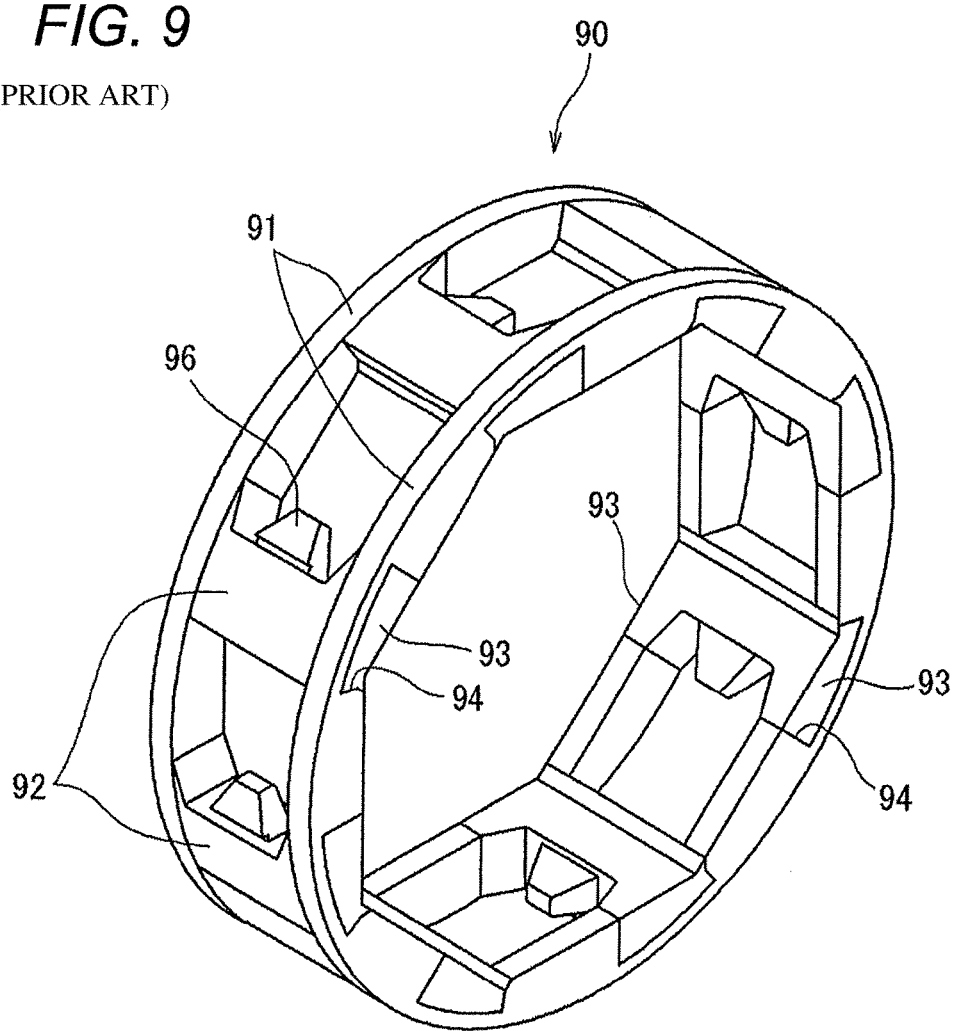
FIG. 9 is a perspective view of the split type cage of the background art.

FIG. 7 is an explanatory view where the pillar end portion 64 of the pillar portion 77 and its surroundings are viewed from the axial direction. The arrow F shown in FIG. 7 indicates the above-mentioned reaction. The reaction F by the spring 75 acts on the annular portion 76 through the pillar end portion 64.

As shown in FIG. 7, the recess portion 84 formed on the annular portion 76 has the wedge-shaped surface 87 facing the inside in the radial direction, and by the wedge-shaped surface 87, in the recess portion 84, a wedge-shaped space 88 that becomes narrower in the radial direction toward the other side in the circumferential direction is formed with the outer peripheral surface 71a of the inner ring 71. The recess portion 84 has, as described above, the first side surface 85 and the second side surface 86 situated on both sides of the wedge-shaped surface 87 in the circumferential direction, and because of these surfaces, the recess portion 84 has a notched shape opened toward the inside in the radial direction.

On the other hand, the pillar end portion 64 fitted in the recess portion 84 has a wedge shape corresponding to the wedge-shaped space 88. That is, the pillar end portion 64 has a wedge shape where the radial dimension gradually decreases toward the other side in the circumferential direction so as to correspond to the wedge-shaped space 88 (see FIG. 6 and FIG. 7). The pillar end portion 64 of the present embodiment has a substantially trapezoidal shape (having arc portions 65b at corners) when viewed from a direction parallel to the axial direction of the cage 74, and has a radial outside surface 65 in contact with the wedge-shaped surface 87, a radial inside surface 66 in contact with the cam surface 71a1 of the outer peripheral surface 71a of the inner ring 71, a first circumferential side surface 67 on one side in the circumferential direction and a second circumferential side surface 68 on the other side in the circumferential direction. The side surfaces 67 and 68 are radially extending surfaces and are substantially parallel to each other, and the whole area of the radial outside surface 65 is a slanting surface that becomes closer to the radial inside surface 66 as it approaches the other side in the circumferential direction, With the above-described structure, the pillar end portion 64 having a wedge shape is fitted in the wedge-shaped space 88, the radial outside surface 65 of the pillar end portion 64 is in contact with the wedge-shaped surface 87 of the recess portion 84, and the radial inside surface 66 of the pillar end portion 64 is in contact with the cam surface 71a1 of the outer peripheral surface 71a of the inner ring 71. For this reason, as described above, the reaction (the reaction of the other in the circumferential direction) F of the spring 75 acts on the pillar portion 77; however, by the wedge-shaped pillar end portion 64 being fitted in the wedge-shaped space 88, the reaction F is transmitted from the radial outside surface 65 and the radial inside surface 66 of the pillar end portion 64 to the annular portion 76 and the inner ring 71. By the radial outside surface 65 and the radial inside surface 66 in contact with the wedge-shaped surface 87 and the cam surface 71a1, the pillar portion 77 is positioned with respect to the circumferential direction.

Figure 10:
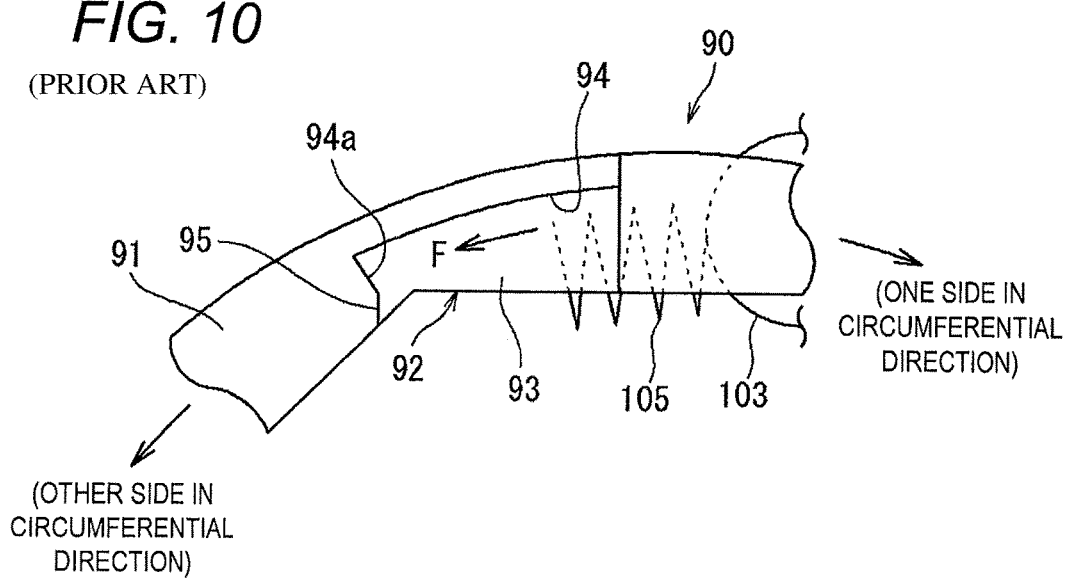
FIG. 10 is an explanatory view where the pillar end portion of the split type cage of the background art and its surroundings are viewed from the axial direction.

For this reason, according to the split type cage 74 of the present embodiment, the load receiving surface 95 provided on the other side of the pillar end portion 93 in the circumferential direction (see FIG. 10) as in the background art is unnecessary. The load receiving surface 95 is a surface substantially orthogonal to the circumferential direction and in contact with the side surface 94a of the recess portion 94 and is a surface receiving the reaction F of the spring 105.

As a consequence of the load receiving surface 95 being unnecessary as described above, the shape of the pillar end portion 64 is simplified, and the shape of the recess portion 84 of the annular portion 76 in which the pillar end portion 64 is fitted is also simplified, which results in the split type cage 74 where the structures of the portions are simplified.

Further, in the present embodiment, the radial outside surface 65 of the pillar end portion 64 is a flat surface although it may be an arc surface convex to the outside in the radial direction and having a large radius, and the wedge-shaped surface 87 with which the radial outside surface 65 is in contact is also a flat surface although it may be an arc surface convex to the outside in the radial direction and having a large radius. Moreover, the cam surface 71a1 of the inner ring 71 is a flat surface, and the whole area of the radial inside surface 66 in contact with the cam surface 71a1 is a flat surface. The first circumferential side surface 67 and the second circumferential side surface 68 of the pillar end portion 64 are also flat surfaces, and the first side surface 85 and the second side surface 86 of the recess portion 84 are also flat surfaces.

For this reason, the pillar end portion 64 of the present embodiment has a substantially trapezoidal shape when viewed from a direction parallel to the axial direction of the cage 74; in particular, the shapes of the radial outside surface 65 of the pillar end portion 64 and the wedge-shaped surface 87 of the recess portion 84 and further, the shape of the radial inside surface 66 of the pillar end portion 64 are simplified compared with the background art, so that the manufacture of the pillar portion 77 and the annular portion 76 is facilitated.

In the present embodiment, since the arc portions 65b convex to the outside in the radial direction are interposed between the radial outside surface 65 and the side surfaces 67 and 68, the pillar end portion 64 has a substantially trapezoidal shape having the arc portions 65b at corners when viewed from a direction parallel to the axial direction of the cage 74.

Moreover, in the present embodiment, the circumferential dimension K1 of the recess portion 84 is larger than the circumferential dimension K2 of the pillar end portion 64 (K1>K2). For this reason, clearances Q1 and Q2 in the circumferential direction are formed between the recess portion 84 and the pillar end portion 64. In particular, the dimensions of the recess portion 84 and the pillar end portion 64 are set so that the clearance Q1 formed on the other side in the circumferential direction is left even if the pillar end portion 64 is urged by the reaction F toward the other side in the circumferential direction to move in the recess portion 84 (the wedge-shaped space 88). Thereby, when the reaction F acts, the radial outside surface 65 of the pillar end portion 64 comes into surface contact (is brought into pressure contact) with the wedge-shaped surface 87 of the recess portion 84 with reliability, so that the radial inside surface 66 of the pillar end portion 64 can be in surface contact (brought into contact) with the cam surface 71a1 of the outer peripheral surface 71a of the inner ring 71 with reliability.

In addition, by the clearances Q1 and Q2 in the circumferential direction being formed between the recess portion 84 and the pillar end portion 64, the work to fit the pillar end portion 64 into the recess portion 84 of the annular portion 76 is facilitated in the assembly of the annular portion 76 and the pillar portion 77. Further, the pillar end portion 64 only necessarily has a wedge shape as described above and it is unnecessary to perform a delicate dimension management to form the pillar end portion 64 and the recess portion 84, so that the manufacture of the pillar portion 77 and the annular portion 76 is facilitated.

From the above, since the one-way clutch 7 shown in FIG. 2 is provided with the split type cage 74 where the structure of the pillar portion 77 and the annular portion 76 is simplified, cost can be reduced, and since the joint 9 shown in FIG. 2 has the one-way clutch 7 provided with the split type cage 74, cost can also be reduced for the joint 9.

While a case where one annular portion 76 is formed of one annular member is described in the above-described embodiment, a plurality of annular members may be superposed in the axial direction to form one annular portion 76 (although not shown). In this case, a protruding portion is formed on one annular member, a recess portion in which the protruding portion is fitted is formed on another annular member to be superposed thereon, and a plurality of annular members are fixed to one another to form one annular portion 76.

Moreover, while in the above-described embodiment (see FIG. 6), a case is described where the pillar end portions 64 have four surfaces (65, 66, 67, 68) to form an outline and the shape (the lateral shape, the cross-sectional shape) of the pillar end portions 64 is substantially trapezoidal, the pillar end portions 64 only necessarily have the radial outside surface 65 and the radial inside surface 66 to form a wedge shape; for example, although not shown, the circumferential side surface (68) on the other side in the circumferential direction may be omitted (or made extremely small compared with the other surfaces) so that the shape of the pillar end portions 64 is substantially triangle.

Moreover, the present invention is not limited to the above-described embodiment and may be changed as appropriate when carried out. For example, while the annular portions 76 of the cage 74 are made of a metal in the one-way clutch 7 in the above-described embodiment, the annular portions 76 may be made of a synthetic resin. In this case, the annular portions 76 can be easily manufactured by injection-molding a synthetic resin material.

Moreover, while the joint 9 for a power generation device of the above-described embodiment is illustrated as a joint for the wind power generation device 1 using wind power as the external power, it is applicable to a power generation device that generates power by using another external power such as water power or thermal power. Further, the one-way clutch 7 of the embodiment of the present invention is applicable to other than the power generation device.

The present application is based upon Japanese Patent Application (Patent Application No. 2013-267275) filed on Dec. 25, 2013, the contents of which are incorporated herein by reference.

DESCRIPTION OF REFERENCE SIGNS

1: Wind Power Generation Device (Power Generation Device); 2: Main Shaft; 3: Speed Increaser; 4: Power Generator; 5: First Rotating Member; 6: Second Rotating Member; 7: One-Way Clutch; 9: Joint; 30: Gear Mechanism (Rotation Transmission Mechanism); 35: Output Shaft; 41: Input Shaft; 42: Rotor; 64: Pillar End Portion; 65: Radial Outside Surface; 66: Radial Inside Surface; 71: Inner Ring; 71a: Outer Peripheral Surface; 71a1: Cam Surface; 72: Outer Ring; 73: Roller (Engagement Element); 74: Cage (Split Type Cage); 75: Spring; 76: Annular Portion; 77: Pillar Portion; 78: Pocket; 84: Recess Portion; 87: Wedge-Shaped Surface; 88: Wedge-Shaped Space; F: Reaction; K1: Circumferential Dimension of Recess Portion; K2: Circumferential Dimension of Pillar End Portion

The invention claimed is:

1. A split type cage, in which a plurality of pockets each accommodating an engagement element between an inner ring and an outer ring of a one-way clutch are formed along a circumferential direction, and a spring provided in each pocket urges the engagement element toward one side in the circumferential direction to thereby cause a reaction toward an other side in the circumferential direction to act, said split type cage comprising:
a pair of annular portions which are provided between the inner ring and the outer ring so as to face in an axial direction, and which comprise a plurality of recess portions formed on an inner periphery side at intervals in the circumferential direction; and a pillar portion which is a separate member from the pair of annular portions, which comprises pillar end portions on both end sides in the axial direction and fitted in the recess portions, and on which the reaction acts, wherein the recess portion comprises a wedge-shaped surface which forms a wedge-shaped space between the wedge-shaped surface and an outer peripheral surface of the inner ring, the wedge-shaped space becoming narrower in a radial direction toward the other side in the circumferential direction, and wherein the pillar end portion has a wedge shape in which a radial dimension decreases toward the other side in the circumferential direction, and comprises a radial outside surface which contacts the wedge-shaped surface and a radial inside surface which contacts the outer peripheral surface of the inner ring.

2. The split type cage according to claim 1,
wherein the radial outside surface is a flat surface, and the wedge-shaped surface is also a flat surface.

3. The split type cage according to claim 2
wherein the radial inside surface is a flat surface.

4. The split type cage according to claim 3,
wherein a circumferential dimension of the recess portion is larger than a circumferential dimension of the pillar end portion.

5. The split type cage according to claim 2,
wherein a circumferential dimension of the recess portion is larger than a circumferential dimension of the pillar end portion.

6. The split type cage according to claim 1,
wherein the radial inside surface is a flat surface.

7. The split type cage according to claim 6,
wherein a circumferential dimension of the recess portion is larger than a circumferential dimension of the pillar end portion.

8. The split type cage according to claim 1,
wherein a circumferential dimension of the recess portion is larger than a circumferential dimension of the pillar end portion.

9. A one-way clutch comprising:
an inner ring;
an outer ring concentric with the inner ring;
a plurality of engagement elements provided between the inner ring and the outer ring;
a cage in which a plurality of pockets accommodating the engagement elements, respectively, are formed along a circumferential direction; and
a spring which is provided in the pocket, and which urges the engagement element toward one side in the circumferential direction, wherein the cage comprises:
a pair of annular portions which are provided between the inner ring and the outer ring so as to face in an axial direction, and which comprise a plurality of recess portions formed on an inner periphery side at intervals in the circumferential direction; and
a pillar portion which is a separate member from the pair of annular portions, which comprises pillar end portions on both end sides in the axial direction and fitted in the recess portions, and on which a reaction toward an other side in the circumferential direction acts by the spring, wherein the recess portion comprises a wedge-shaped surface which forms a wedge-shaped space between the wedge-shaped surface and an outer peripheral surface of the inner ring, the wedge-shaped space becoming narrower in a radial direction toward the other side in the circumferential direction, and wherein the pillar end portion has a wedge shape in which a radial dimension decreases toward the other side in the circumferential direction, and comprises a radial outside surface which contacts the wedge-shaped surface and a radial inside surface which contacts the outer peripheral surface of the inner ring.

10. A joint for a power generation device, the power generation device comprising:
a main shaft which rotates by external power;
a speed increaser comprising a rotation transmission mechanism which increases a rotation speed of the main shaft, and an output shaft which outputs a rotation increased in speed by the rotation transmission mechanism; and
a power generator which comprises an input shaft rotating by receiving the rotation of the output shaft and which generates power by a rotation of a rotor which rotates integrally with the input shaft, wherein said joint for the power generation device comprises:
a first rotating member which rotates integrally with the output shaft of the speed increaser;
a second rotating member which rotates integrally with the input shaft of the power generator; and
the one-way clutch according to claim 9, which is disposed between the first rotating member and the second rotating member.

* * * * *